(12) United States Patent
Sora

(10) Patent No.: US 8,468,816 B2
(45) Date of Patent: Jun. 25, 2013

(54) HYBRID WORKING MACHINE

(75) Inventor: Toshio Sora, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 719 days.

(21) Appl. No.: 12/640,572

(22) Filed: Dec. 17, 2009

(65) Prior Publication Data

US 2010/0170239 A1   Jul. 8, 2010

(30) Foreign Application Priority Data

Jan. 6, 2009 (JP) ................................. 2009-001004

(51) Int. Cl.
*F16D 31/02* (2006.01)

(52) U.S. Cl.
USPC .................................. 60/414; 60/445; 60/452

(58) Field of Classification Search
USPC .................................... 60/413, 414, 445, 452
See application file for complete search history.

(56) References Cited

U.S. PATENT DOCUMENTS

| | | | |
|---|---|---|---|
| 6,454,033 B1 * | 9/2002 | Nathan et al. | 60/414 |
| 6,460,332 B1 * | 10/2002 | Maruta et al. | 60/414 |
| 6,666,022 B1 | 12/2003 | Yoshimatsu et al. | |
| 7,069,673 B2 * | 7/2006 | Kagoshima et al. | 60/420 |
| 7,086,226 B2 * | 8/2006 | Oguri | 60/414 |
| 7,525,206 B2 * | 4/2009 | Kagoshima et al. | 290/40 C |
| 7,614,224 B2 * | 11/2009 | Kato | 60/414 |
| 2007/0214782 A1 * | 9/2007 | Komiyama et al. | 60/431 |

FOREIGN PATENT DOCUMENTS

| | | |
|---|---|---|
| EP | 1 834 854 A2 | 9/2007 |
| JP | 59-23090 | 2/1984 |
| JP | HEI 04-143473 | 5/1992 |
| JP | HEI 05-79502 | 3/1993 |
| JP | 2001-12274 | 1/2001 |
| JP | 2003-184604 | 7/2003 |
| JP | 2005-83242 | 3/2005 |
| JP | 2007-247230 | 9/2007 |

OTHER PUBLICATIONS

Office Action issued Feb. 19, 2013, in Japanese Patent Application No. 2009-001004, filed Jan. 6, 2009 (with English-language Translation), 6 pages.

* cited by examiner

*Primary Examiner* — Michael Leslie
(74) *Attorney, Agent, or Firm* — Oblon, Spivak, McClelland, Maier & Neustadt, L.L.P.

(57) ABSTRACT

In a hybrid working machine in which the maximum engine output is set at the average power and the maximum pump input is set to be larger than the maximum engine output in a normal state, in an abnormal state in which the level of charge of a battery decreases and assistance ability of a motor function of a power machine is lost, the minimum pump flow rate is reduced to a value equal to or smaller than a standby flow rate, the standby flow rate being the minimum pump flow rate used in normal state control, and a set value of the maximum pump input is changed such that the maximum pump input is smaller than the maximum engine output.

1 Claim, 5 Drawing Sheets

HYBRID WORKING MACHINE

BACKGROUND OF THE INVENTION

1. Field of the Invention

The present invention relates to a hybrid working machine that uses engine power and electric power.

2. Description of the Related Art

In a hybrid working machine (for example, an excavator), a hydraulic pump that drives a hydraulic actuator and a power machine that performs a generator function and a motor function (usually a generator/motor) are connected to an engine. An electric storage device is charged using the generator function of the power machine, and the discharge power of the electric storage device makes the power machine perform the motor function. The motor function assists driving of the hydraulic pump (see Japanese Unexamined Patent Application Publication No. 2001-12274).

In a fully hydraulic excavator (hereinafter referred to as an ordinary excavator), the maximum input of the hydraulic pump is set equal to or lower than the maximum output of the engine so that the engine may not be overloaded. That is, $$\text{maximum pump input} < \text{maximum engine output.}$$

In contrast, in a hybrid machine that uses the engine power and the assistance power as described above, the maximum output of the engine is set to be lower than that of an ordinary excavator with consideration of the assistance power. (Usually, the maximum output of the engine is set at the average power. Hereinafter, this case is described.) That is, $$\text{maximum pump input} > \text{maximum engine output.}$$

The pump input is defined as (load pressure)×(pump flow rate). In a hybrid working machine, the pump input is shared by the engine output and the assistance output of the power machine.

Regarding control of the pump flow rate in an ordinary excavator, two methods are used in combination. One is a method of controlling the pump flow rate in accordance with the operation amount of operation means for operating the hydraulic actuator (hereinafter referred to as "lever operation amount") as illustrated in FIG. 6 (flow rate control). The other is a method of controlling the flow rate in accordance with a load pressure (pump pressure) as illustrated in FIG. 7 (hereinafter referred to as "power control", see Japanese Unexamined Patent Application Publication No. 59-23090). The lower of the flow rates calculated by the two control methods is selected, and a regulator of the pump is instructed to use the flow rate. FIG. 8 illustrates a relationship between the regulator instruction and the pump flow rate.

The flow rate control sets the flow rate at the standby flow rate when the lever is neutral (with consideration of an initial system response) and at the maximum when the lever is fully operated.

In contrast, the power control sets the flow rate at the maximum at the initial load pressure (in an interval A in FIG. 7) and at the minimum at the relief pressure.

Therefore, for a load pressure in the pressure interval A, a pump flow rate set by the flow rate control, which corresponds to a lever operation amount, is selected. For a load pressure higher than the interval A, a pump flow rate set by the power control is selected.

In general, the standby flow rate of the flow rate control is set to be lower than the minimum flow rate of the power control. Therefore, the minimum flow rate of the system is the standby flow rate and does not fall below the standby flow rate.

A hybrid working machine with the above-described structure has the following problem.

As described above, in the hybrid working machine, the maximum engine output is set at a relatively low value (average power), and any shortage in power is covered by using the motor function of the power machine driven by the electric storage device. Thus, $$\text{maximum pump input} > \text{maximum engine output.}$$

Therefore, if a high load state (a state in which the load is equal to or higher than the average power) continues, the level of charge of the electric storage device decreases. When the level of charge falls below a limit, the assistance function of the power machine is lost.

In this case, control for reducing the pump input has to be performed so as to avoid overload. However, with the flow rate control and the power control, the minimum flow rate of the pump cannot be made to be equal to or smaller than the standby flow rate. As a result, the pump input cannot be reduced to a level with which overload can be avoided.

Therefore, a problem exists in that the engine may stall due to overdischarge of the electric storage device (degradation of the electric storage device due to frequent charging/discharging) or due to overload of the engine.

SUMMARY OF THE INVENTION

The present invention provides a hybrid working machine in which overdischarge of an electric storage device and stalling of an engine when the level of charge falls below a level equal to or smaller than a set value (a value at which assistance ability is lost) are prevented by changing details of control.

A hybrid working machine according to the present invention includes an engine; a hydraulic pump connected to the engine, the hydraulic pump driving a hydraulic actuator; a power machine connected to the engine, the power machine performing a generator function and a motor function; an electric storage device charged by the generator function of the power machine, the electric storage device discharging power that drives and makes the power machine perform the motor function so as to assist driving of the hydraulic pump; pump flow rate instruction means that outputs an instruction of a pump flow rate determined in accordance with an operation amount of operation means for operating the hydraulic actuator or in accordance with a load pressure of the hydraulic pump; a regulator that controls a flow rate of the hydraulic pump on the basis of the instruction of the determined pump flow rate output from the pump flow rate instruction means; and a power unit for the hybrid working machine in which a set value of the maximum input of the hydraulic pump is set to be larger than a maximum engine output. The power unit includes level-of-charge detection means for detecting a level of charge of the electric storage device, and correction means for correcting the determined pump flow rate output from the pump flow rate instruction means in accordance with the level of charge that is detected, wherein the correction means is configured to change, in an abnormal state, the set value of the maximum input of the hydraulic pump to a value equal to or lower than the maximum engine output by decreasing a minimum pump flow rate to a value equal to or lower than a value in an ordinary state, the abnormal state being a state in which the level of charge that is detected is equal to or lower than a set level, the normal state being a state in which the level of charge that is detected is higher than the set level.

According to the present invention, in the hybrid working machine in which the maximum pump input is larger than the maximum engine output, in an abnormal state in which the level of charge of the electric storage device decreases and assist ability of the motor function of the power machine is lost (or on the verge of being lost), the maximum pump input is made to be smaller than the maximum engine output by reducing the minimum pump flow rate to a value lower than that in a normal state. Therefore, overdischarge of the electric storage device and stalling of the engine due to overload can be securely prevented.

It is preferable that the pump flow rate instruction means (A) determine and output the instruction of the pump flow rate by selecting a lower of a pump flow rate obtained by flow rate control and a pump flow rate obtained by power control, the flow rate control being a method of controlling the pump flow rate in accordance with the operation amount, the power control being a method of controlling the pump flow rate in accordance with the load pressure,
(B) determine and output a standby flow rate as a minimum flow rate in the flow rate control, the standby flow rate being lower than a minimum flow rate in the power control, and
(C) set the minimum pump flow rate at a value lower than the standby flow rate in the abnormal state.

In this case, in the hybrid working machine in which flow rate control is performed by selecting the lower of a pump flow rate obtained by the flow rate control in accordance with the operation amount and a pump flow rate obtained by the power control, a set value of the maximum pump input is made to be smaller than the maximum engine output by setting the minimum pump flow rate in the abnormal state to be lower than the standby flow rate, the standby flow rate being the minimum flow rate in the normal state. Therefore, the invention can be applied to a hybrid working machine that determines the pump flow rate by selecting the lower of the pump flow rates obtained by the flow rate control and the power control, without changing the fundamental control method but by changing details of the control.

DESCRIPTION OF THE PREFERRED EMBODIMENTS

An embodiment of the present invention is described with reference to FIGS. 1 to 5.

In the embodiment, a battery (a secondary battery such as a lithium-ion battery) is used as an electric storage device.

Figure 1:
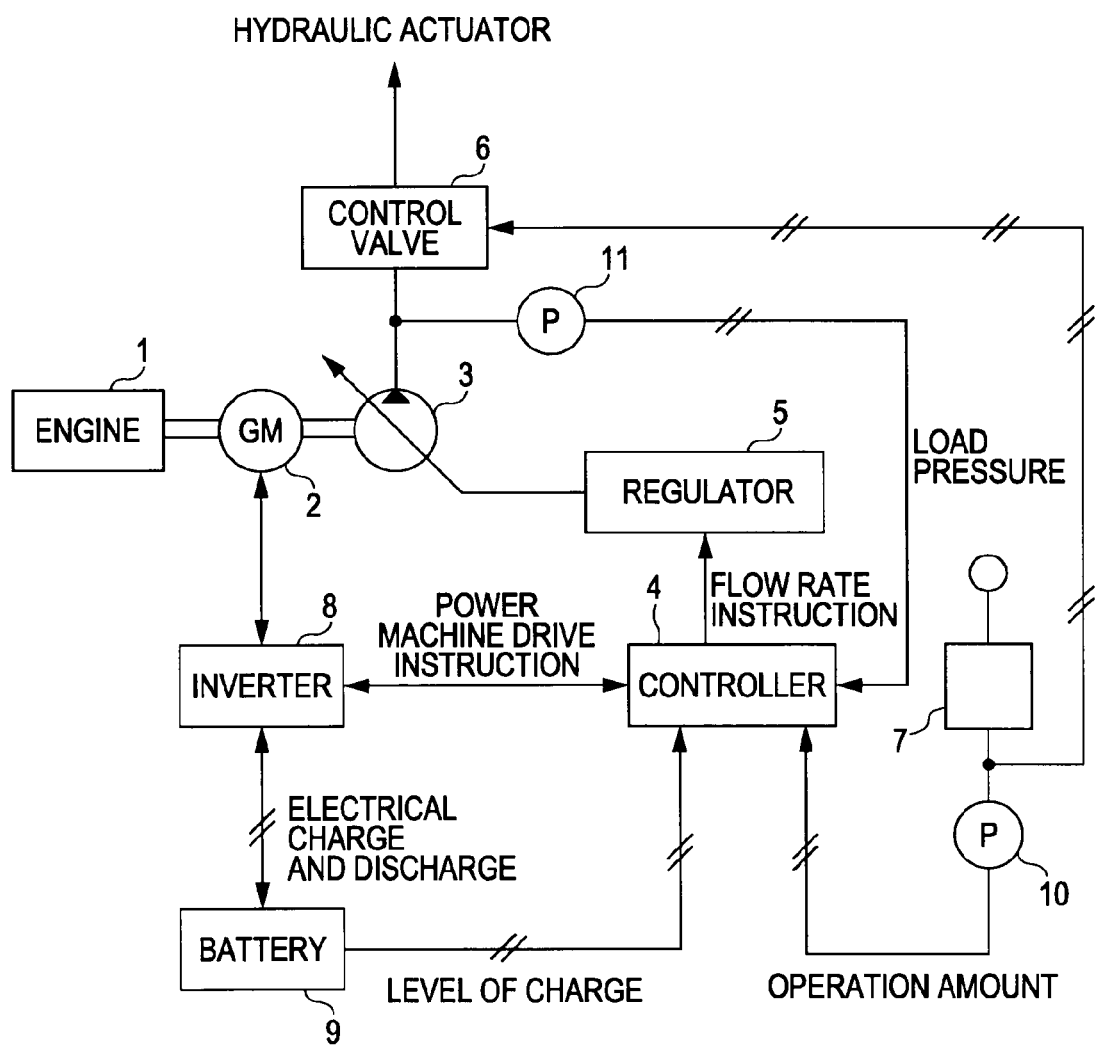
FIG. 1 is a block diagram of the overall structure of a power unit according to an embodiment of the present invention.

FIG. 1 is a block diagram of the entire system.

As illustrated in FIG. 1, a power machine 2 and a hydraulic pump 3 are connected to an engine 1. The power machine 2 performs a generator function and a motor function. (The power machine 2 is typically a generator/motor. However, the power machine 2 may include a generator and a motor as independent components.)

In the hybrid working machine, power can be supplied to the hydraulic pump 3 by a so-called parallel method or by a so-called series method. The present invention is applicable to both methods.

The hydraulic pump 3 is a variable displacement pump having a variable flow rate. The flow rate of the hydraulic pump 3 changes when a regulator 5, which is under control of a controller 4, changes the tilt angle of the pump. Pressure oil is supplied from the hydraulic pump 3 to a plurality of hydraulic actuators through a control valve 6. In an excavator, the hydraulic actuators correspond to a boom cylinder, an arm cylinder, a bucket cylinder, and a hydraulic traction motor.

In practice, a control valve is provided to each of the actuators. However, in FIG. 1, the control valve 6 represents a group of the control valves.

The regulator 5 may be directly operated with electric signals from the controller 4, or may be operated with hydraulic pressure applied from a solenoid valve that is operated with electric signals from the controller 4.

A remote control valve 7 serves as operation means. The control valve 6 is operated with pilot pressure corresponding to an operation amount of the remote control valve 7 (hereinafter referred to as a lever operation amount), so that supply of the pressure oil to the hydraulic actuator or recovery of the pressure oil from the hydraulic actuator (the direction and the speed of a movement of the hydraulic actuator) is controlled.

The power machine 2 is connected to a battery 9 via an inverter 8. The inverter 8 serves as power machine control means.

The inverter 8 controls switching between the generator function and the motor function of the power machine 2. The inverter 8 also controls current or torque of the power machine 2 as a generator or a motor, and charging and discharging of the battery 9 in accordance with the output of the generator.

The following information is input to the controller 4.
i. Level of charge of the battery 9 The level of charge is calculated by integrating the battery current detected with an electric current sensor (not shown) and incorporating consideration of the voltage and the temperature characteristic of the battery into the integrated current.
ii. Operation amount (lever operation amount) of the remote control valve 7 The operation amount can be calculated by detecting the pilot pressure of the remote control valve 7 with a pilot pressure sensor 10.
iii. Load pressure (pump pressure) detected by a pump pressure sensor 11

Figure 2:
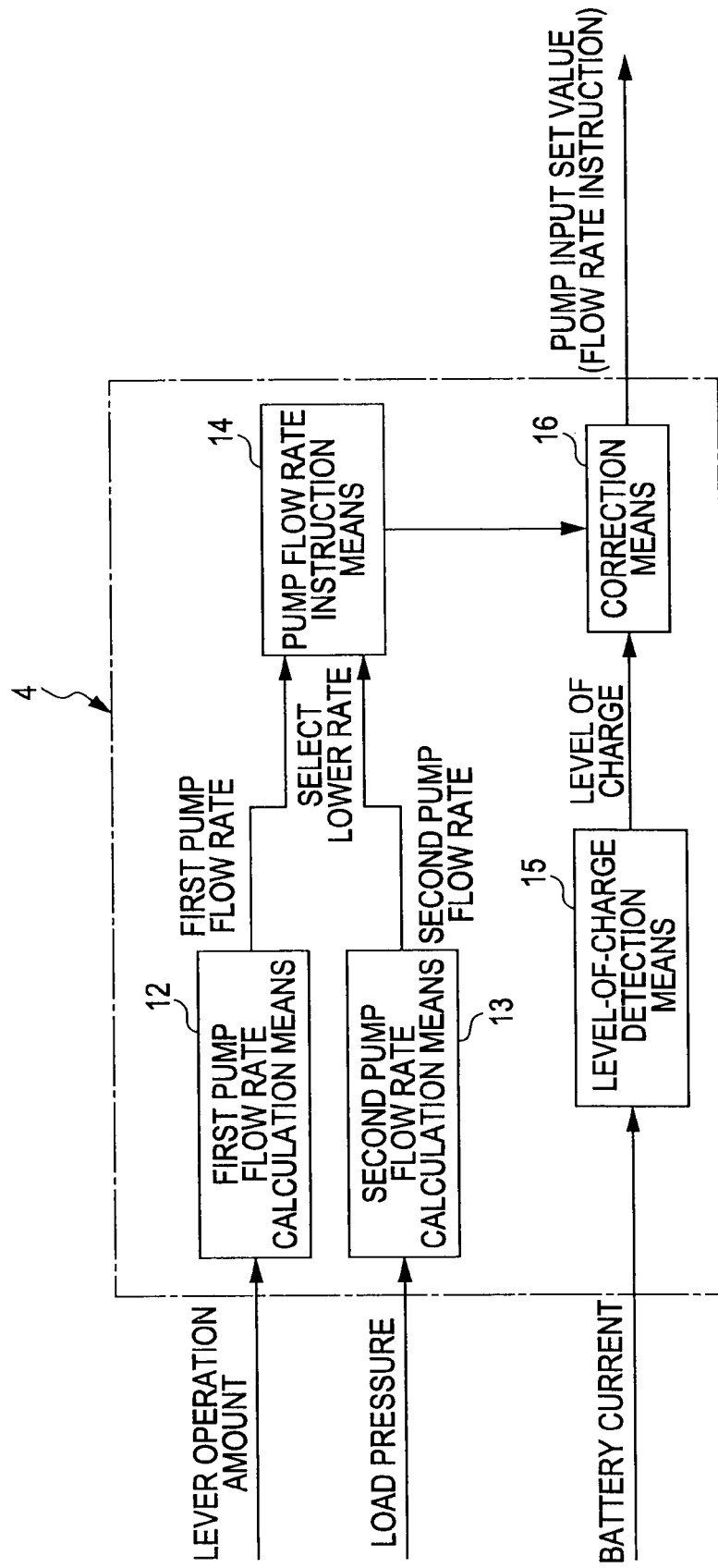
FIG. 2 is a block diagram of a controller of the power unit.

FIG. 2 is a block diagram of the controller 4.

The controller 4 includes first pump flow rate calculation means 12, second pump flow rate calculation means 13, pump flow rate instruction means 14, level-of-charge detection means 15, and correction means 16. The first pump flow rate calculation means 12 calculates the pump flow rate from the lever operation amount so as to perform flow rate control. The second pump flow rate calculation means 13 calculates the pump flow rate from a load pressure so as to perform power control. The pump flow rate instruction means 14 selects the lower of the flow rates calculated by the first and second calculation means 12 and 13, and outputs an instruction of a flow rate. The level-of-charge detection means 15 detects the level of charge of the battery by incorporating consideration of the battery voltage and other factors into calculation of the integrated value of the battery current, as described above. The correction means 16 receives the level of charge of the battery from the level-of-charge detection means 15 and the instruction of a flow rate from the pump flow rate instruction means 14.

The correction means 16 determines a set value of the maximum pump input in accordance with whether the level of charge of the battery is equal to or smaller than a set value that is the minimum value at which the power machine 2 can provide assistance power by using the motor function.

Figure 3:
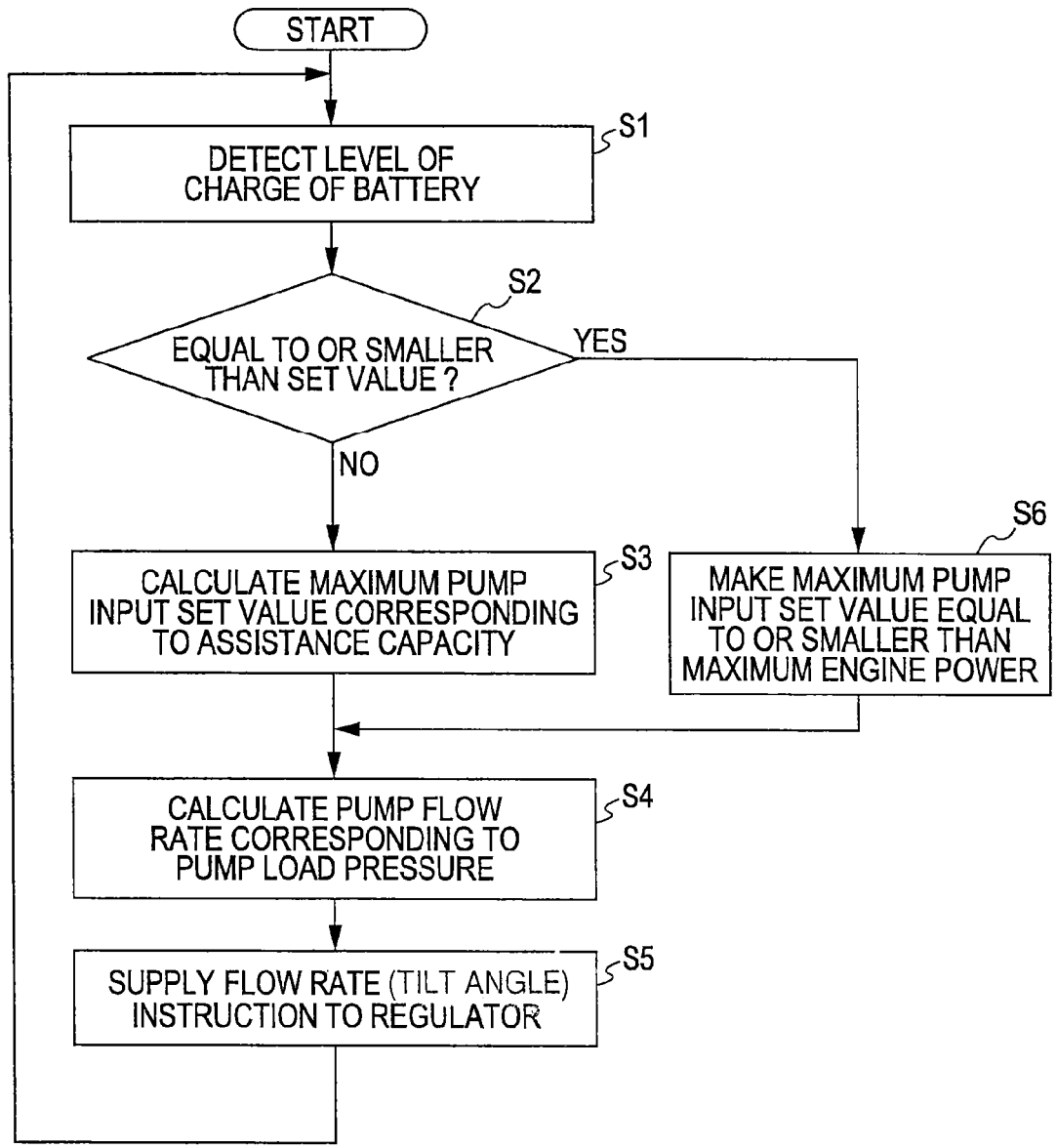
FIG. 3 is a flowchart of an operation of the power unit.

This process is described using the flowchart of FIG. 3.

At the start, the level of charge of the battery is detected, and it is determined whether the level of charge is equal to or smaller than the set value (whether assistance is impossible) (step S1).

If the determination is "NO", which means that the level of charge is greater than the predetermined value, normal state control is performed. That is, a set value of the maximum pump corresponding to the assistance ability (level of charge) is calculated (step S3), a pump flow rate corresponding to a pump load pressure by the power control is calculated (step S4), and the pump flow rate (tilt angle) is supplied to the regulator 5 illustrated in FIG. 1 (step S5).

If the determination in step S2 is "YES" (if the level of charge is equal to or smaller than the predetermined value), abnormal state control, which is control in the case when the assistance ability of the power machine 2 is lost, is performed. That is, the set value of the maximum pump input is changed to a value equal to or smaller than the maximum engine output, and an instruction of a flow rate is output to the regulator 5 in accordance with the set value of the maximum pump input in an abnormal state in step S5.

Figure 4:
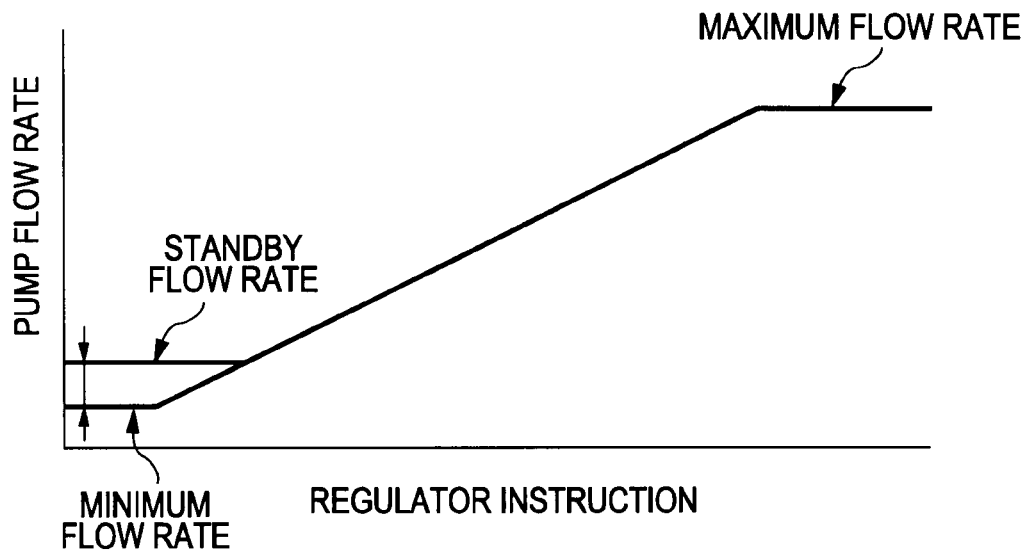
FIG. 4 is a graph illustrating a relationship between the regulator instruction and the pump flow rate of the power unit.

FIG. 4 illustrates a relationship between the instruction of a flow rate (regulator instruction) supplied to the regulator 5 and the pump flow rate. In the normal state control, the standby flow rate is the minimum flow rate of the system. In the abnormal state control, a flow rate lower than the standby flow rate is set as the minimum flow rate of the system.

Thus, the set value of the maximum pump input in the abnormal state can be set at a value equal to or smaller than the maximum engine output.

Figure 5:
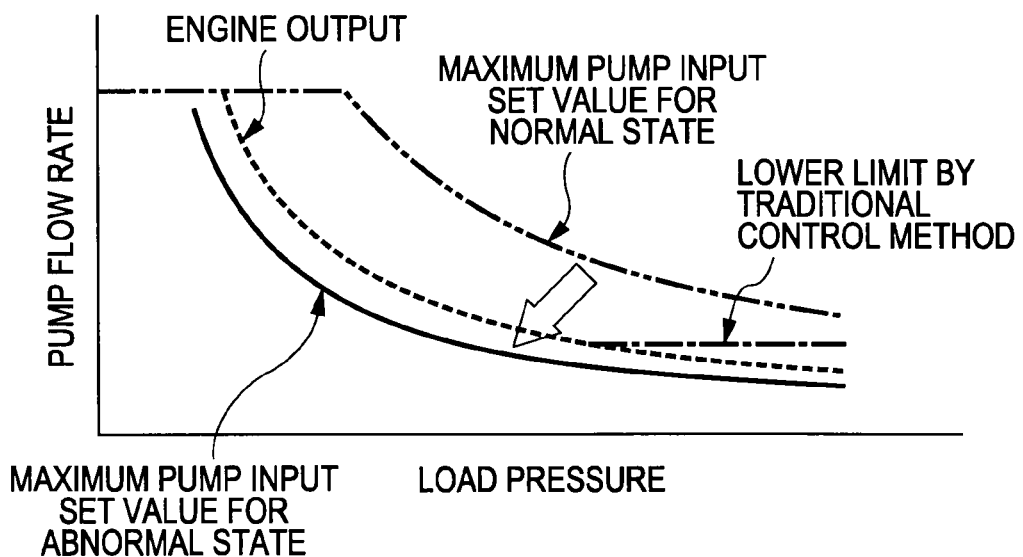
FIG. 5 is a graph illustrating a relationship between the load pressure (pump pressure) and the pump flow rate of the power unit.
Figure 6:
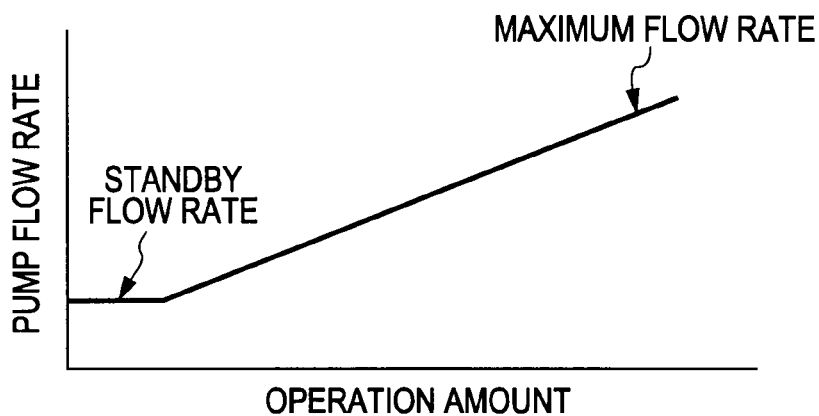
FIG. 6 is a graph illustrating a relationship between the operation amount and the pump flow rate in a flow rate control of an ordinary excavator.
Figure 7:
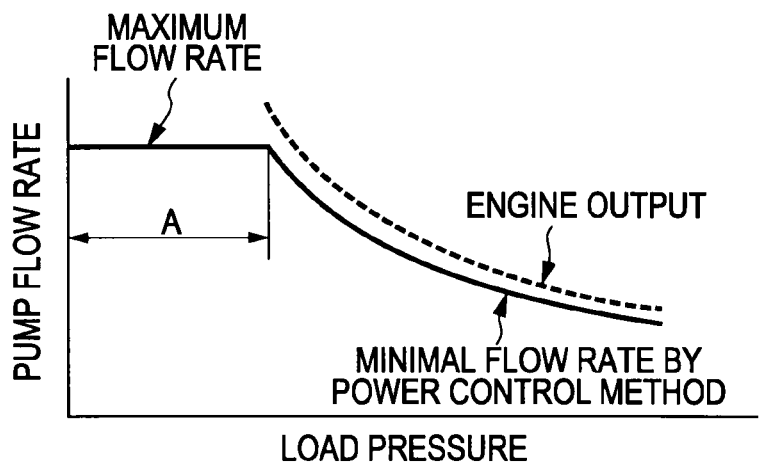
FIG. 7 is a graph illustrating a relationship between the load pressure and the pump flow rate in a power control of the ordinary excavator.
Figure 8:
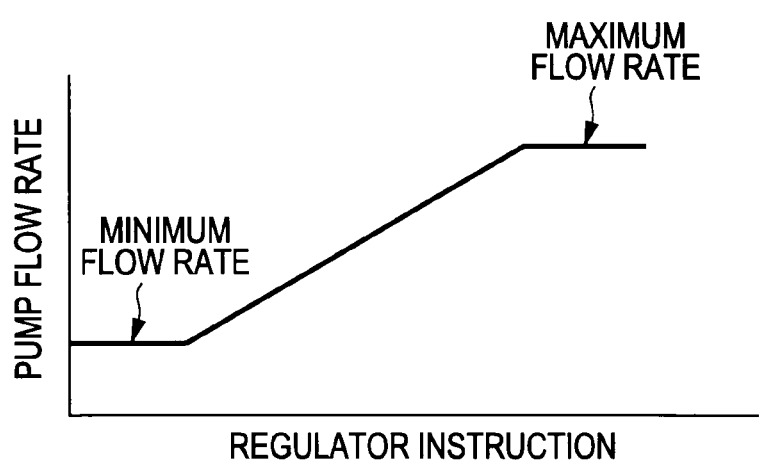
FIG. 8 is a graph illustrating a relationship between the regulator instruction and the pump flow rate of the ordinary excavator, the regulator instruction being issued by selecting the lower of the flow rates obtained by the flow rate control and the power control.

FIG. 5 illustrates a relationship between the pump pressure and the pump flow rate in the normal state control and the abnormal state control. In the normal state control, which is the same as the control in existing hybrid working machines, the set value of the maximum pump input, which is represented by the two-dot chain line, is always equal to or greater than the maximum engine output (limited by the standby flow rate).

In the abnormal state control, the minimum flow rate is reduced to a level equal to or smaller than the standby flow rate. Thus, the set value of the maximum pump input, which is determined by (minimum pump flow rate)×(maximum load pressure), can be reduced to a value equal to or smaller than the maximum engine output.

Therefore, in the abnormal state, in which the level of charge of the battery decreases and the assistance ability of the motor function of the power machine is lost (or on the verge of being lost), the set value of the maximum pump input is changed such that an inequality "maximum pump input<maximum engine output" holds. Therefore, stalling of the engine due to overdischarge of the electric storage device and engine overload can be securely prevented.

With this power machine, since the minimum flow rate of the pump can be decreased to a level equal to or lower than the standby flow rate as described above, the following control can be realized.

(x) Energy can be saved by setting the maximum input of the hydraulic pump at the lowest level when a relief state continues for a certain time.

(y) Energy can be saved by reducing the minimum pump flow rate to a level equal to or lower than the standby flow rate in a so-called deceleration state, which is a state in which the rotation of the engine is reduced while the power machine is on standby.

(z) The engine can be readily started by reducing the load on the engine by setting the minimum pump flow rate to a level equal to or smaller than the standby flow rate.

Although the invention has been described with reference to the preferred embodiments in the attached figures, it is noted that equivalents may be employed and substitutions made herein without departing from the scope of the invention as recited in the claims.

What is claimed is:

1. A hybrid working machine comprising:
    an engine;
    a hydraulic pump connected to the engine, the hydraulic pump driving a hydraulic actuator;
    a power machine connected to the engine, the power machine performing a generator function and a motor function;
    an electric storage device charged by the generator function of the power machine, the electric storage device discharging power that drives and makes the power machine perform the motor function so as to assist driving of the hydraulic pump;
    pump flow rate instruction means that outputs an instruction of a pump flow rate determined in accordance with an operation amount of operation means for operating the hydraulic actuator or in accordance with a load pressure of the hydraulic pump;
    a regulator that controls a flow rate of the hydraulic pump on the basis of the instruction of the determined pump flow rate output from the pump flow rate instruction means; and
    a power unit for the hybrid working machine in which a set value of the maximum input of the hydraulic pump is set to be larger than a maximum engine output, the power unit including
        level-of-charge detection means for detecting a level of charge of the electric storage device, and
        correction means for correcting the determined pump flow rate output from the pump flow rate instruction means in accordance with the level of charge that is detected,
    wherein the correction means is configured to change, in an abnormal state, the set value of the maximum input of the hydraulic pump to a value equal to or lower than the maximum engine output by decreasing a minimum pump flow rate to a value equal to or lower than a value in an ordinary state, the abnormal state being a state in which the level of charge that is detected is equal to or lower than a set level, the normal state being a state in which the level of charge that is detected is higher than the set level, and
    wherein the pump flow rate instruction means
    (A) determines and outputs the instruction of the pump flow rate by selecting a lower of the pump flow rate determined in accordance with the operation amount and the pump flow rate determined in accordance with the load pressure, (B) determines and outputs a standby flow rate as a minimum flow rate in controlling the pump flow rate in accordance with the operation amount, the standby flow rate being lower than a minimum flow rate in controlling the pump flow rate in accordance with the load pressure, and (C) sets the minimum pump flow rate at a value lower than the standby flow rate in the abnormal state.

* * * * *